2,986,493
Patented May 30, 1961

2,986,493
METHOD OF COMBATING SOIL-DWELLING NEMATODES WITH PHENAZINES

Jan Cornelis Overeem, Utrecht, and Johan Dirk Bijloo, Van Houtenlaan, Weesp, Netherlands, assignors to North American Philips Company, Inc., New York, N.Y., a corporation of Delaware No Drawing. Filed Feb. 10, 1959, Ser. No. 792,271

Claims priority, application Netherlands Feb. 10, 1958

12 Claims. (Cl. 167—33)

This invention relates to a method of combating nematodes. More particularly this invention relates to a method of combating those species of nematodes that cause eelworm diseases in plants. Examples of these species are the Heterodera species such as the larvae of *Heterodera rostochiensis* (potato cysticolous eelworm), Heloidogyne species (root knob eelworms), Ditylenchus species (stem eelworms), Pratylenchus species, Hoplolaimus species and larvae of *Anguina tritici* (wheat gall eelworm).

These nematodes cause great damage to agricultural crops. However, attempts to combat these nematodes by known methods have not proved too successful.

It is an object of this invention to provide effective compositions for combating nematodes, particularly nematodes that cause eelworm diseases in plants. This and other objects of the invention will be apparent from the description that follows:

According to this invention we have found that phenazine and certain derivatives thereof corresponding to the generic formulae:

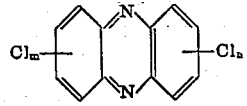

and

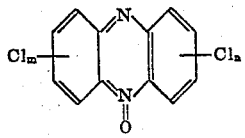

in which $m$ and $n$ are each selected from the numbers consisting of 0, 1 and 2 are very effective nematocides particularly in combating those nematodes that cause eelworm diseases in plants.

Examples of the nematocides of the invention are 1-chlorophenazine, 1,8 - dichlorophenazine, 1,9 - dichlorophenazine, 1,2-dichlorophenazine, 1,4-dichlorophenazine, 1,3-dichlorophenazine, 3,8-dichlorophenazine, 1-chlorophenazine - N - oxide, 2,8 - dichlorophenazine - N-oxide, 1,2,7,8 - tetrachloro - phenazine - N - oxide, phenazine-N-oxide, 2-chlorophenazine, and phenazine. Of these compounds particularly phenazine and 2-chlorophenazine have proved to be the most effective nematocides.

The phenazines of the invention are known compounds and may be prepared by known methods for example by heating aniline and nitrobenzene or their chloro-derivatives in the presence of potassium hydroxide in a solvent such as benzene, the Wohl-Von Aue Synthesis. See for example Maffei et al., Gazz. Chim. 83, pages 327–34 (1953).

The nematocides of this invention may be mixed in with the soil at the rate of about 1 to 1000 lbs. per acre. These nematocides may be applied both in diluted or undiluted state to the soil. If applied in diluted state they may be applied as dusts, solutions or aqueous dispersions.

As dusts the nematocides are mixed by grinding with inert carriers such as chalk, dolomite, attapulgite, kaolin, bentonite, talc, quartz, diatomaceous earth and pipe clay and the resultant mixture ground to about 5 to $25\mu$. The inert carrier may be used in high proportions for example as much as 99% of the active compositions.

If the particular phenazine derivative is water soluble it may be dissolved in water and the aqueous solution thus formed may be applied to the soil.

The phenazine compounds may also be dispersed or dissolved in inert organic liquids such a stoluene, xylene, ketones such as methyl ethyl ketone, acetone, cyclohexanone and acetophenone, and mixtures thereof. These solutions may be applied directly to the soil as such or first formed into aqueous emulsions and then applied to the soil.

In any event surface active agents or wetting agents may be added to the active compositions in order to improve the uniformity of their mixing with the soil.

These surface active agents or wetting agents may be anionic, cationic or non-ionic. Examples of these agents are the sodium salt of a long chain alkyl sulfonate such as sodium dodecylbenzene sulfonate, esters of polyhydroxy alcohols such as polyglycol oleate, polyglycol laurate, glyceryl mannitan laurate, polyoxyethylene sorbitol hexaoleate, and polyoxyethylene monopalmitate and alkyl aryl sulfonates such as sodium alkyl napthalene sulfonate, salts of resin acids such as sodium lignin sulfonate, polyoxyethylene oleyl ether and oleylamido methyl laurate. These surface active agents may be used in amounts ranging from .05% to 50% by weight of the phenazine compound.

If in dry form such as a dust or in undiluted form the active compositions may be plowed into the soil, placed in irrigation water feeding the soil, spread on the soil and soaked in by hosing or by rain.

If employed in liquid form the active composition may be sprayed on the soil and allowed to soak in, injected into the soil by being forced under pressure into small holes three to eight inches deep drilled into the soil, mixed with irrigation water or applied by any other suitable means.

Further the active compositions may be added to other pesticidal compositions and artificial fertilizers.

Also the active compositions may be applied directly to bulbs, the root system of plants or any other location on which the nematodes appear.

The invention will be more fully explained by reference to the following examples and tables.

I

A dust is produced by grinding approximately 5 parts by weight of phenazine or 2-chlorophenazine together with approximately 95 parts by weight of kieselguhr to an average particle size of approximately $10\mu$.

II

A dust is produced by mixing approximately 50 parts by weight of phenazine or 2-chlorophenazine with approximately 5 parts by weight of oleylamido-methyl-laurate, approximately 10 parts by weight of calcium lignin sulphonate and approximately 35 parts by weight fo dolomite (calcium magnesium carbonate), this mixture subsequently being ground to an average particle size of approximately $10\mu$.

III

An active solution was prepared by dissolving 5 parts by weight of 2-chlorophenazine in 50 parts by weight of toluene.

IV

An active aqueous emulsion was prepared by dissolving 10 parts by weight of phenazine in 100 parts by weight of a mixture of equal parts of toluene and methyl ethyl ketone, adding 2 parts by weight of polyoxyethylene sorbitan monolaurate to this solution and emulsifying this mixture with 100 parts by weight of water.

Tests proving the nematocidal effect of compounds according to the invention were carried out as follows:

30 mgs. of the compound to be tested were ground with the addition of 5 drops of solution of 5% of polyoxyethylene-monolaurate and subsequently suspended in 30 ccm. of water. By further dilution with water, suspensions having different concentrations of effective compound were produced from the suspension thus obtained, which suspensions were used for carrying out the tests.

Into an embryo dish of 4 by 4 cc. having a cavity of 3.5 cc. there were first introduced 1.5 cc. of the suspension to be investigated and subsequently about 100 nematodes. Subsequently, the dish was closed with a roughly ground glass so as to admit a sufficient quantity of air to prevent the nematodes being immobilised by want of oxygen. By means of a binocular the vitality of the nematodes was determined after 4, 24, 48 and 140 hours respectively.

In this manner the lowest concentrations of effective compound in the suspension at which the kill of the test specimen was complete within 140 hours' exposure was determined.

The tests were carried out with larvae of *Heterodera rostochiensis* lured from the cysts for 2 days, *Ditylenchis dipsaci* and larvae of *Anguina tritici* (both species soaked for 17 hours from the anabiotical condition).

In Table I the results of these tests are listed. This table shows the minimum lethal dosage of the tested compound required to kill all the test specimen within a time of exposure of 140 hours. The minimum lethal dosage is stated as the concentration of the active compound in the used suspension, expressed in parts by weight of effective compound per million of parts by weight of diluent (water).

Table I

| Compound | Heterodera rostochiensis | Ditylenchus dipsaci | Anguina tritici |
| --- | --- | --- | --- |
| Phenazine | 25 | 50 | 12 |
| 2-chlorophenazine | 12 | 50 | 6 |
| 1-chlorophenazine | 50 |  | 6 |
| Phenazine-N-oxide | 50 |  | 25 |

The results show that in particular phenazine and 2-chlorophenazine may advantageously be used for combating the agriculture and horticulture-menacing nematodes.

Table II states the results of a series of tests with 2-chlorophenazine in vitro, carried out as before. The table states the percentage of nematodes killed by the action of the 2-chlorophenazine within a time of exposure of 140 hours.

Table II

| Nematode | Concentration of active material in parts per million | | | | | |
| --- | --- | --- | --- | --- | --- | --- |
|  | 500 | 100 | 50 | 25 | 12 | 6 |
| Heterodera rost. (Larvae) | 100 | 100 | 100 | 100 | 100 | 90 |
| Ditylenchus dips. | 100 | 99 | 100 | 80 | 70 | 30 |
| Anguina tritici (Larvae) | 100 | 100 | 100 | 100 | 100 | 100 |

While we have described our invention in connection with specific embodiments and applications, other modifications thereof will be readily apparent to those skilled in this art without departing from the spirit and scope of the invention as defined in the appended claims.

What is claimed is:

1. A method of combating nematodes comprising the step of applying to the soil containing said nematodes a nematocidal composition containing in a nematocidally active proportion at least one compound selected from the group of compounds corresponding to the formulae:

and

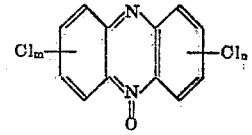

wherein $m$ and $n$ are each numbers selected from 0, 1 and 2 and a carrier therefor.

2. A method of combating nematodes comprising the step of applying to the soil containing said nematodes a nematocidal composition containing in a nematocidally active proportion phenazine and a carrier therefor.

3. A method of combating nematodes comprising the step of applying to the soil containing said nematodes a nematocidal composition containing in a nematocidally active proportion 2-chlorophenazine and a carrier therefor.

4. A method of combating nematodes comprising the step of applying to the soil containing said nematodes a nematocidal dust consisting of a finely divided mixture of about 5 parts by weight of phenazine and 95 parts by weight of kieselguhr, the average particle size in said mixture being about 10μ.

5. A method of combating nematodes comprising the step of applying to the soil containing said nematodes a nematocidal dust consisting of a finely divided mixture of about 5 parts by weight of 2-chlorophenazine and 95 parts by weight of kieselguhr, the average particle size in said mixture being about 10μ.

6. A method of combating nematodes comprising the step of applying to the soil containing said nematodes a wettable nematocidal powder consisting essentially of a finely divided mixture of about 50 parts by weight of phenazine, about 5 parts by weight of oleylamido-methyl laurate, about 10 parts by weight of calcium lignin sulfonate and about 35 parts by weight of dolomite, the average particle size of said powder being about 10μ.

7. A method of combating nematodes comprising the step of applying to the soil containing said nematodes a wettable nematocidal powder consisting essentially of a finely divided mixture of about 50 parts by weight of 2-chlorophenazine, about 5 parts by weight of oleylamido-methyl laurate, about 10 parts by weight of calcium lignin sulfonate and about 35 parts by weight of dolomite, the average particle size of said powder being about 10μ.

8. The method of claim 1 in which in addition a wetting agent is employed.

9. The method of claim 2 in which in addition a wetting agent is employed.

10. The method of claim 3 in which in addition a wetting agent is employed.

11. A method of combating nematodes comprising the step of applying to the soil containing said nematodes a nematocidal composition containing in a nematocidally active proportion at least one compound selected from the group of compounds corresponding to the formulae:

and

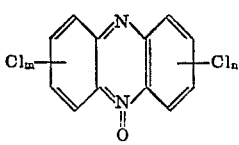

wherein $m$ and $n$ are each numbers selected from 0, 1 and 2 and a liquid carrier therefor.

12. A method of combating nematodes comprising the step of applying to the soil containing said nematodes a nematocidal composition containing in a nematocidally active proportion at least one compound selected from the group of compounds corresponding to the formulae:

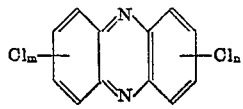

and

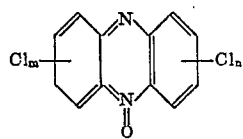

wherein $m$ and $n$ are each numbers selected from 0, 1 and 2 and a solid carrier therefor.

References Cited in the file of this patent

UNITED STATES PATENTS

| | | |
|---|---|---|
| 1,982,909 | Flint | Dec. 4, 1934 |
| 2,057,044 | Meisenburg | Oct. 13, 1936 |
| 2,372,588 | Larsen et al. | Mar. 27, 1945 |
| 2,377,446 | Payne | June 5, 1945 |
| 2,435,204 | Davidson | Feb. 3, 1948 |
| 2,473,984 | Bickerton | June 21, 1949 |
| 2,502,244 | Carter | Mar. 28, 1950 |
| 2,543,580 | Kay | Feb. 27, 1951 |
| 2,726,485 | Thomas | Dec. 13, 1955 |
| 2,743,209 | Jones | Apr. 24, 1956 |
| 2,770,638 | Giolito | Nov. 13, 1956 |
| 2,730,547 | Dye | Jan. 10, 1957 |
| 2,779,680 | Wolf | Jan. 29, 1957 |
| 2,794,727 | Barrows | June 4, 1957 |
| 2,802,021 | Heininger | Aug. 6, 1957 |
| 2,802,818 | Wheeler | Aug. 13, 1957 |

OTHER REFERENCES

King: Chemicals Evaluated as Insecticides, U.S. Dept. Agri. Handbook No. 69, pp. 1–15 and 255, May 1954.